(12) United States Patent
Kim et al.

(10) Patent No.: US 8,278,997 B1
(45) Date of Patent: Oct. 2, 2012

(54) APPARATUS AND METHODOLOGY FOR CONTROLLING HOT SWAP MOSFETS

(75) Inventors: Sangsun Kim, San Jose, CA (US); Honggang Sheng, Milpitas, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/251,838

(22) Filed: Oct. 3, 2011

(51) Int. Cl.
*G05F 1/10* (2006.01)
*G05F 3/02* (2006.01)

(52) U.S. Cl. ............................................. 327/541

(58) Field of Classification Search ................. 327/541
See application file for complete search history.

(56) References Cited

U.S. PATENT DOCUMENTS

| | | | | |
|---|---|---|---|---|
| 6,578,152 | B1 * | 6/2003 | Burnside ........................ | 713/300 |
| 6,788,012 | B2 * | 9/2004 | Sakuma et al. ................ | 315/344 |
| 6,798,153 | B2 * | 9/2004 | Mattas et al. .................. | 315/307 |
| 7,558,974 | B2 * | 7/2009 | Makino et al. ................. | 713/300 |
| 7,821,753 | B2 * | 10/2010 | Evans et al. .................... | 361/90 |
| 7,889,472 | B1 * | 2/2011 | Norman .......................... | 361/84 |
| 7,932,577 | B2 * | 4/2011 | Webb et al. .................... | 257/531 |
| 7,932,693 | B2 * | 4/2011 | Lee et al. ....................... | 318/802 |
| 7,995,317 | B2 * | 8/2011 | Norman .......................... | 361/84 |
| 2004/0051383 | A1 * | 3/2004 | Clark et al. ..................... | 307/36 |
| 2005/0168896 | A1 * | 8/2005 | Vanderzon ...................... | 361/78 |
| 2007/0234081 | A1 * | 10/2007 | Makino et al. ................. | 713/300 |
| 2008/0174926 | A1 * | 7/2008 | Evans et al. .................... | 361/90 |
| 2009/0039855 | A1 * | 2/2009 | D'Souza et al. ............... | 323/285 |
| 2009/0166754 | A1 * | 7/2009 | Webb et al. .................... | 257/382 |
| 2011/0089924 | A1 * | 4/2011 | Norman .......................... | 323/284 |
| 2011/0261493 | A1 * | 10/2011 | Norman .......................... | 361/84 |
| 2011/0285430 | A1 * | 11/2011 | Todaka ........................... | 327/143 |
| 2011/0309809 | A1 * | 12/2011 | Rao et al. ....................... | 323/282 |
| 2012/0001562 | A1 * | 1/2012 | Kuennen et al. ............... | 315/224 |
| 2012/0043818 | A1 * | 2/2012 | Stratakos et al. ............... | 307/77 |

* cited by examiner

*Primary Examiner* — Lincoln Donovan
*Assistant Examiner* — Adam Houston
(74) *Attorney, Agent, or Firm* — Turocy & Watson, LLP

(57) ABSTRACT

Systems and methods for reliable and efficient hot swap control are disclosed herein. The system includes a feedback circuit that senses a load voltage and enables a gate driver, in response to a difference between input and output voltages falling below a predefined threshold value. Once enabled, the gate driver instantaneously, or almost instantaneously, turns on a set of paralleled metal-oxide-semiconductor field-effect transistors (MOSFETs) in a hot swap control circuit and/or enables a load. Since the MOSFETs are switched instantaneously, or almost instantaneously, they do not operate in a linear mode and thus reliable sharing of load current is achieved. In addition, on detecting an overcurrent condition, the gate driver is disabled, which in turn switches off the MOSFETs. Accordingly, both inrush current limiting and overcurrent protection can be provided.

25 Claims, 14 Drawing Sheets

APPARATUS AND METHODOLOGY FOR CONTROLLING HOT SWAP MOSFETS

TECHNICAL FIELD

The subject disclosure relates to power systems and, more particularly, to an efficient and inexpensive mechanism for adaptively controlling MOSFETs of a hot swap controller.

BACKGROUND

Hot swapping refers to replacing an electrical (or a computer) system's component without shutting down the electrical system. In conventional systems, hot swapping is managed by hot swap controllers. Hot swap controllers can be implemented on integrated circuits (ICs) and used in applications such as server boards and power supplies to manage the hot swapping of components such as batteries. Conventional hot swap controllers use one or more paralleled metal-oxide-semiconductor field-effect transistors (MOSFETs), through which the current drawn by the newly added load flows.

If a hot swap controller uses only one MOSFET, that MOSFET would need to support 100% of the load current. However, conventional hot swap controllers often use multiple MOSFETs coupled in parallel, so that the load current is divided between the MOSFETs and the conduction losses are reduced. When a new device or load is initially plugged into an electrical system, the new load's uncharged power supply filter capacitors present low impedance and demand a large and sudden "inrush" current. Inrush currents can be an order of magnitude larger than maximum steady state currents. Large inrush currents can damage electrical components and/or cause operational faults.

So, conventionally, when a new load is first plugged in to an electrical system's power source, the hot swap controller gradually decreases the on-resistance of the MOSFET(s) to limit the inrush current. The hot swap controller controls the on-resistance of the MOSFET(s) by adjusting gate voltage(s) of the MOSFET(s). That means that the MOSFETs are put in a linear mode of operation. An issue with using parallel MOSFETs in a linear mode of operation is that the MOSFETs experience substantial thermal stress and thus cannot reliably share currents equally. Specifically, during the linear mode operation, gate voltages of the MOSFETs are not set to allow for maximum possible current flow and so the currents flowing through the MOSFETs can vary depending on gate voltage level.

Thus, to maintain a reliable hot swap control, MOSFETs with a maximum rating (e.g., each MOSFET supporting 100% load current) are typically required to withstand high, varying and unpredictable inrush currents, even though the MOSFETs are coupled to each other in parallel. MOSFETs that support higher current values are generally more expensive, leading to higher overall system costs. In addition, conventional hot swap control systems introduce a significant voltage disturbance in the output of DC power source due to rapid current variation, which can reset a load.

SUMMARY

The following presents a simplified summary of the specification in order to provide a basic understanding of some aspects of the specification. This summary is not an extensive overview of the specification. It is intended to neither identify key or critical elements of the specification nor delineate any scope particular implementations of the specification, or any scope of the claims. Its sole purpose is to present some concepts of the specification in a simplified form as a prelude to the more detailed description that is presented later.

The systems and methods disclosed herein relate to a hot swap controller having a single or paralleled metal-oxide-semiconductor field-effect transistors (MOSFETs) coupled between a power source and a load. The controller allows the paralleled MOSFETs to operate in fully on and off states, and not in linear mode. The MOSFETs are turned on, e.g., allowed to conduct maximum possible current, if the difference between the voltage across the load and the power source voltage is below a predetermined threshold level.

In an aspect, a method for hot swapping is disclosed in which an input voltage is supplied, and an output voltage is progressively raised to approach the input voltage. The difference between the input voltage and the output voltage is monitored, and a current path is provided for a new load if the difference between the input and output voltages is less than a first threshold value. Furthermore, the new load is enabled when the current path is provided. In an example, current level up to the full capacity of the current path is allowed to flow through the current path. The load current is monitored upon enabling the load, and especially to detect a condition in which the load current exceeds a second threshold value. Upon the detection of such a condition, current is not allowed to flow through the current path.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
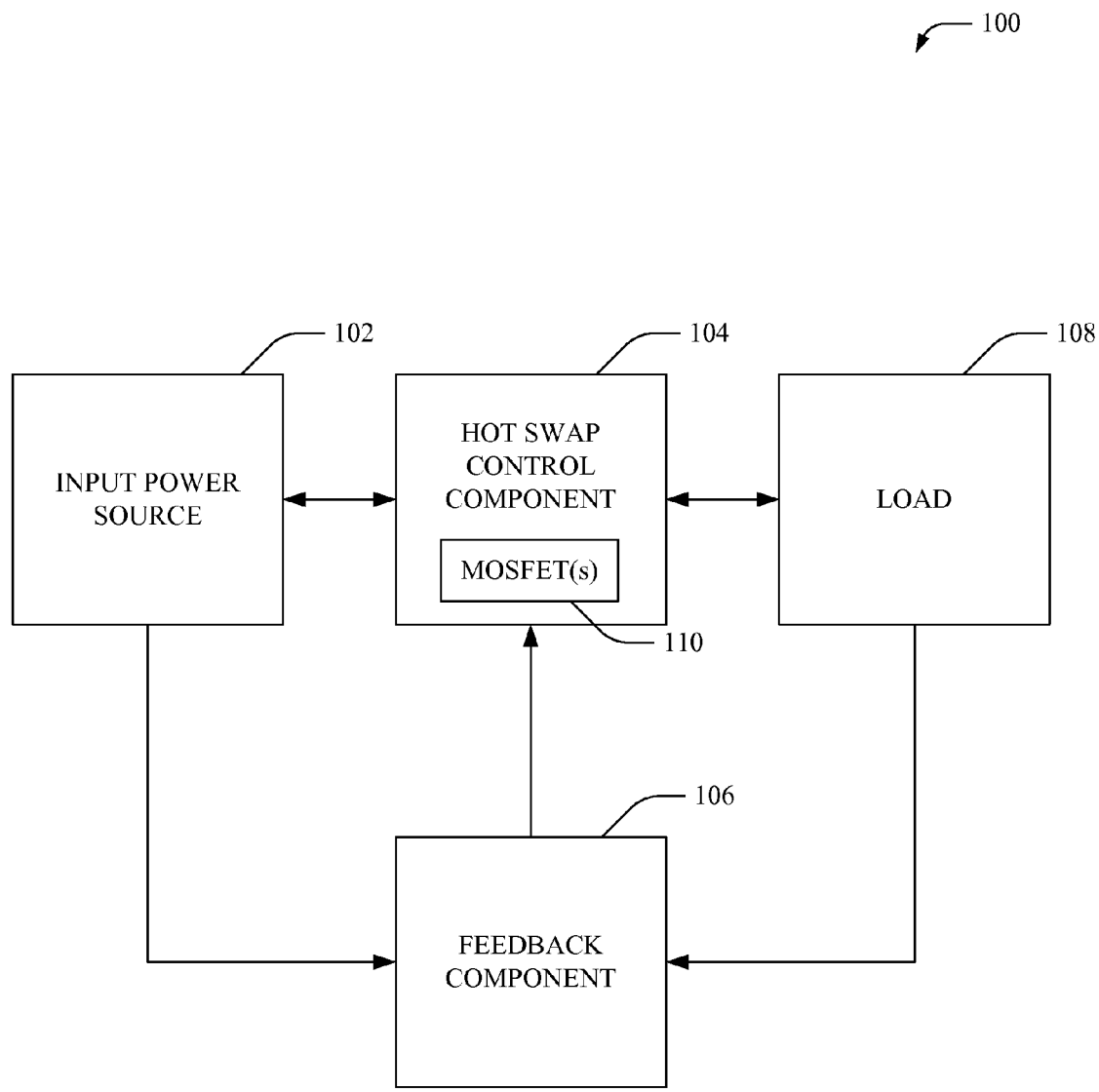
FIG. 1 illustrates a high-level functional block diagram for an example hot swap controller architecture.

Hot swap controllers are generally utilized to control inrush currents during a turn-on (or start-up) period and to limit load currents to safe pre-determined levels in cases of overload current faults during static (or steady state) operations. Systems and methods disclosed herein provide a cost effective hot swap controller that utilizes inexpensive field-effect transistors (FETs), coupled in parallel, in order to provide lower conduction losses and system costs. Moreover, the hot swap controller disclosed herein prevents FETs from operating in their linear region, thus enabling the FETs to equally, or substantially equally, share load current and improving FET reliability.

Various aspects or features of the subject disclosure are described with reference to the drawings, wherein like reference numerals are used to refer to like elements throughout. In the subject specification, numerous specific details are set forth in order to provide a thorough understanding of the subject disclosure. It may be evident, however, that the disclosed subject matter may be practiced without these specific details, or with other methods, components, materials, etc. In other instances, well-known structures and devices are shown in block diagram form in order to facilitate describing the subject disclosure.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification are not necessarily all referring to the same implementation. Furthermore, the particular features, structures, or characteristics may be combined in any suitable manner in one or more implementations.

As used in this application, the terms "component," "module," "system," or the like are generally intended to refer to a computer-related entity, either hardware (e.g., a circuit), a combination of hardware and software, software, or software in execution or an entity related to an operational machine with one or more specific functionalities. Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Further, the word "coupled" is used herein to mean direct or indirect electrical or mechanical coupling.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not illustrated herein.

Referring initially to FIG. 1, there is illustrated an example system 100 that provides cost effective and reliable hot swap control, according to an aspect of the subject disclosure. Specifically, the system 100 can provide inrush current limiting and an overcurrent protection feature that can be utilized in most any hot swap control application. Typically, hot swap controllers can be employed by various systems, for example, distributed power systems, high availability servers (e.g., Telecom servers), disk arrays, powered insertion boards, and the like.

In particular, system 100 can include a hot swap control component 104 that couples an input power source 102, for example, a direct current (DC) source, and a load 108, for example, a DC-to-DC (DC-DC) converter. In an exemplary implementation, the load 108 is a new load that is to be added to the system 100. In one aspect, when the load 108 is initially connected to the input source 102 (e.g., via hot swap control component 104), the hot swap control component 104 controls the initial load current. Before the load 108 is coupled to the input source 102, it is unpowered. To power the load 102, both voltage and a current path must be provided to the load 108. Once the hot swap control component 104 has safely connected the load 108 to the input power source 102, during normal operation, the hot swap control component 104 provides short-circuit and/or overcurrent protection. In general, the initial and/or overcurrent current threshold level can be pre-programmed. Moreover, during normal operation, the hot swap control component 104 can detect overcurrent conditions caused by spikes/surges in supply voltage and/or overcurrent conditions caused by faulty loads.

In one implementation, the hot swap control component 104 can include at least one FET, such as, but not limited to, a metal-oxide-semiconductor field-effect transistor (MOSFET) 110, through which the load current flows. Typically, a single MOSFET 110 is used for low power applications and multiple MOSFETs 110, coupled in parallel, are used for high power applications, to distribute the current load. If only one MOSFET 110 is utilized, the MOSFET 110 supports 100% of the load current. For high power applications, the load current can be very high (e.g., 100-500 Amperes) and usually a single MOSFET 110 cannot support such a high current. Thus, multiple MOSFETs 110 can be employed, in parallel, to divide the load current and to achieve current sharing between the MOSFETs 110. For example, if two MOSFETs 110 are utilized for a 100 Amperes (A) load current, only 50 A current can flow through each MOSFETs 110. Accordingly, low cost MOSFETs 110 that support lower current ratings (e.g., two MOSFETs that support 50 A current, rather than one MOSFET that supports 100 A current) can be utilized.

According to one implementation, for reliable hot swap control, the system 100 prevents the MOSFET(s) 110 from operating in their linear region(s). Typically, during linear operation, gate voltage of the MOSFET(s) 110 is not high, e.g., the current path is not fully open or closed, and so current through the MOSFET(s) 110 can vary. To avoid this mode of operation, system 100 includes a feedback component 106 that can sense voltage at the input of the load and determine when the sensed voltage is equal to a predefined threshold voltage (e.g., source voltage). In one aspect, the MOSFET(s)

110 remain off until the sensed voltage equals the predefined threshold voltage, after which the MOSFET(s) 110 are turned on, by applying a high voltage at the gate(s) of the MOSFET(s) 110. In particular, the voltage at the gate(s) is switched from a low to a high voltage instantaneously, or substantially instantaneously, to avoid linear mode operation. The load 108 can be enabled, for example, by activating an enable pin, at the same time as and/or after the MOSFET(s) 110 are turned on.

Additionally or alternatively, the feedback component 106 can sense current, for example, through the MOSFET(s) 110 or a sense resistor (shown in FIG. 2) and detect overcurrent to protect the hot swap control component 104 and/or the load 108. It can be appreciated that the feedback component 106 can monitor various parameters, such as, but not limited to, source voltage, load voltage, load current, die temperature, etc. The protection thresholds associated with the various parameters can be fixed and/or programmable, and can be adjusted and/or defined based in part on the application and/or components utilized in system 100.

Further, it can be appreciated that the mechanical design of system 100 can include different component selections, component placements, etc., to achieve an optimal performance. Moreover, the input power source 102, hot swap control component 104, feedback component 106, and the load 108 can include most any electrical circuit(s) that can include components and circuitry elements of any suitable value in order to implement the aspects of the subject innovation. Furthermore, it can be appreciated that the components of system 100 can be implemented on one or more integrated circuit (IC) chips. For example, in one implementation, hot swap control component 104 and the feedback component 106 can be implemented in a single IC chip. In other implementations, one or more of the input power source 102, hot swap control component 104, feedback component 106, and the load 108 are fabricated on separate IC chips.

Figure 2:
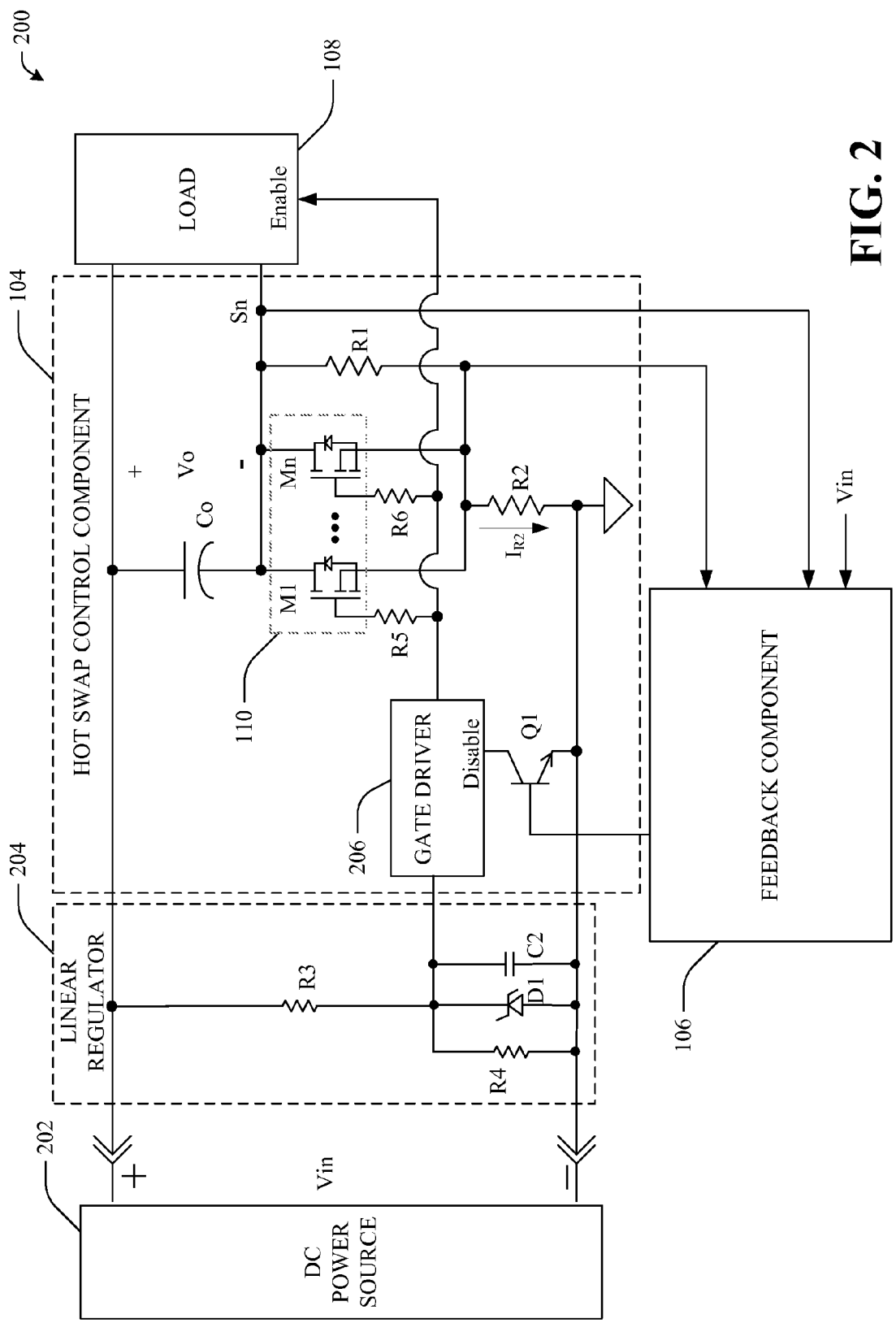
FIG. 2 illustrates an example circuit for accurately sharing load current between metal-oxide-semiconductor field-effect transistors (MOSFETs) during hot swapping.

Referring now to FIG. 2, there is illustrated an example circuit 200 for even sharing load current by transistor switches during hot swapping in accordance with an implementation. The circuit 200 includes a load 108 coupled to a DC power source 202 via a hot swap control component 104. As an example, load 108 can include, but is not limited to, a DC-DC converter with a non-isolated or an isolated topology. In one example, the non-isolated topology can comprise, but is not limited to, a buck, a boost, a buck-boost, a Ćuk, and/or a charge pump converter, which can be utilized for either step up or voltage inversion. In another example, the isolated topology can comprise a two-stage isolated DC-DC converter, such as, but not limited to, a fly-back, a fly-forward, a half bridge, a full bridge and/or a dual full bridge topology.

In addition, circuit 200 can include a linear regulator 204 that regulates voltage output of the DC power source 202. As an example, the linear regulator 204 can comprise a zener diode D1, operating in its breakdown region, in parallel with resistor R4 and capacitor C2. Moreover, the linear regulator 204 provides constant output voltage by adjusting a voltage divider network comprising the resistor R4 and a resistor R3. In one aspect, to avoid inrush currents when the load 108 is initially connected to this constant voltage, the hot swap control component 104 is utilized. The hot swap control component 104 includes a set of MOSFETs 110 (e.g., negative channel MOSFETs (nMOSFETs)), M1-Mn, where 'n' can be most any suitable number in accordance with the subject matter disclosed herein. The paralleled MOSFETs provide a lower conduction loss and facilitate load current sharing. Typically, a gate driver 206 is utilized to control the gate voltage of the MOSFETs 110. According to an implementation, the gate driver 206 is enabled/disabled by a feedback component 106. The feedback component 106 senses current and/or voltage in the circuit 200 and controls operation of the gate driver 206 based on comparison of the sensed current and/or voltage values with respective threshold values.

Initially, when the load 108 is coupled to the DC power source 202, the MOSFETs 110 are turned off. Moreover, the capacitor Co begins to charge through an inrush current limiting resistor R1, and the corresponding voltage (Vo) across the capacitor Co gradually increases. As an example, R1 can be a negative temperature coefficient (NTC) thermistor, positive temperature coefficient (PTC) thermistor, or a resistor. In one aspect, the feedback component 106 monitors voltage Vo and enables the gate driver 206 once Vo is greater than a threshold value, for example, input voltage (Vin) across the DC power source 202. In other words, the operation of gate driver 206 is delayed until Vo is equal to or approximately equal to Vin. Typically, the feedback component 106 can control operation of gate driver 206 to provide protection, such as, but not limited to an input under voltage, voltage difference between input and output, and overcurrent. Once enabled, the output of the gate driver switches from low (e.g., 0 volts (V)) to high (e.g., Vcc).

Moreover, all the paralleled MOSFETs 110 are turned on at substantially the same time and do not operate in their linear regions. Accordingly, the load current flowing through capacitor Co is equally or approximately equally shared and automatically balanced between the MOSFETs 110. This reliable current sharing allows utilization of a wide selection of MOSFETs 100. For example, low cost MOSFETs having a low current rating can be utilized, reducing overall system costs. In addition, conventional systems cannot support very high power (e.g., 500 A) applications; however, the circuit 200 can leverage multiple low power MOSFETs in parallel to share the load current in high power systems. Typically, the number of MOSFETs 110 in parallel can be adjusted or defined based on the application and/or rating of the individual MOSFETs. In one aspect, the load 108 can be enabled after or at the same time as the MOSFETs 110 are turned on. As an example, the load 108 can include a DC-DC converter, which typically has an enable pin that can be controlled by the output signal of the gate driver 206.

During normal operation (e.g., after the load 108 is enabled and/or MOSFETs 110 are switched on), the feedback component 106 can sense current through a current sense resistor R2. Moreover, the feedback circuit identifies whether the sensed current is above an overcurrent threshold and disables the gate driver 206 to protect both hot swap circuit (e.g., hot swap control component 104) and down-stream converter against overcurrent (e.g., load 108). The gate driver 206 in turn switches off the MOSFETs until the DC source current reduces below the overcurrent threshold and/or the input and output voltages (Vin, Vo) meet a predefined requirement. Typically, the hot swap MOSFETs 110 are turned on and off very rapidly, such that linear mode operation is avoided.

Figure 3:
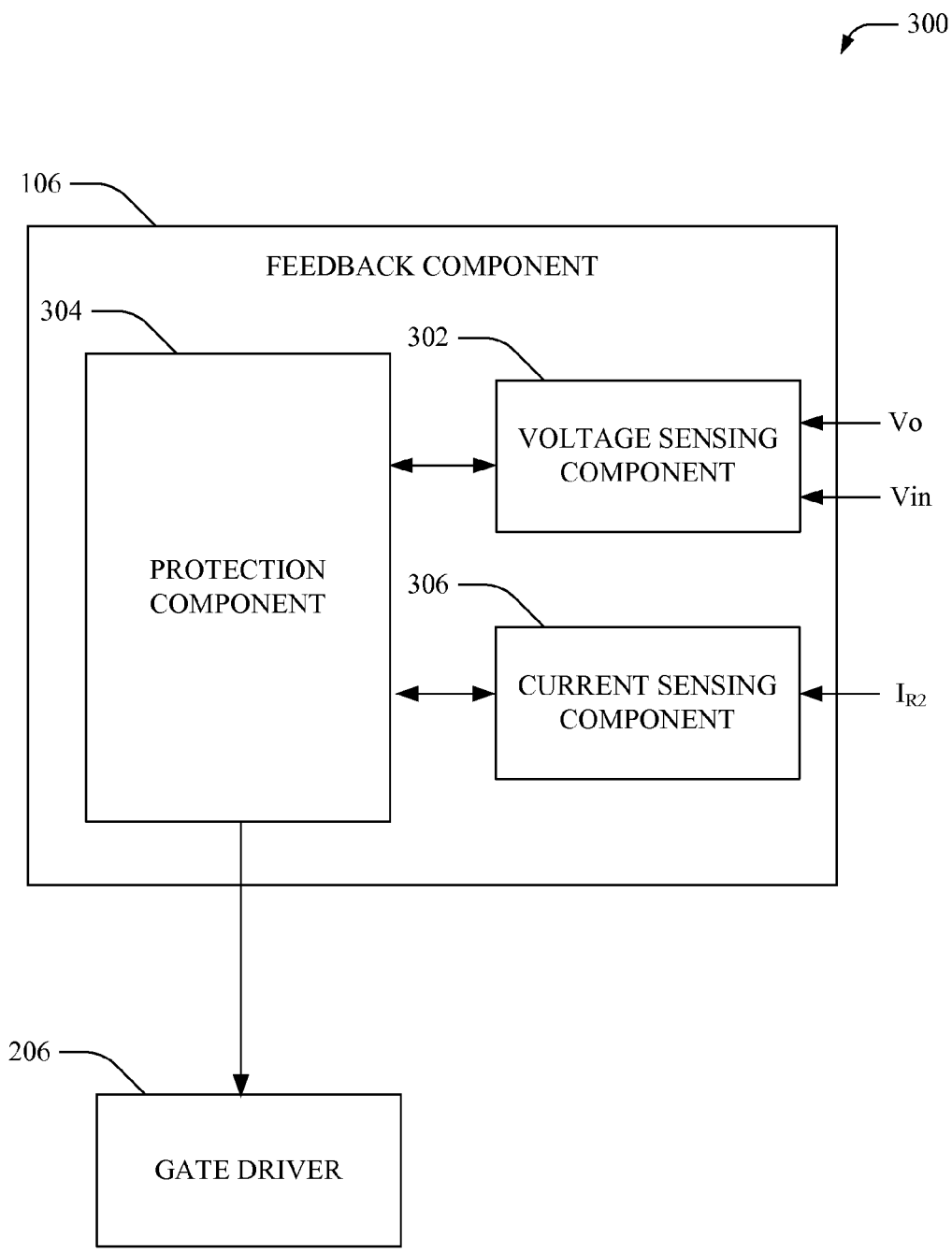
FIG. 3 illustrates an example system that provides the feedback to control the operation of a gate driver.

Referring now to FIG. 3, there is illustrated an example system 300 that provides feedback to control operation of a gate driver 206, according to an aspect of the subject disclosure. Typically, the feedback component 106 can monitor various parameters in a hot swap control system, such as, but not limited to, load current, load voltage, source voltage, temperature, etc. Moreover, the feedback component 106 can analyze the monitored parameters and control a gate driver 206 based on the analysis.

According to an implementation, the feedback component 106 can include a voltage sensing component 302, which can be employed to detect load voltage Vo (e.g., voltage across capacitor Co) and/or source voltage Vin (e.g., voltage across the input power source). In addition, the voltage sensing component 302 can determine difference between the source voltage and the load voltage (Vin-Vo). Typically, when the input power source is applied in the hot swap circuit, the output capacitor (Co) can charge gradually through an inrush current limiting resistor R1. Accordingly, the load voltage (Vo) gradually increases as the output capacitor (Co) charges. Based in part on the sensed voltage values, a protection component 304 can apply one or more rules/policies to control operation of the gate driver 206, which in turn controls switching of MOSFET(s) within the hot swap control system.

In one aspect, the protection component 304 can compare a voltage difference between the source voltage and the load voltage (Vin-Vo) to a predetermined threshold value. Alternately, the protection component 304 can determine whether the load voltage is equal to the source voltage (Vin-Vo=0). Moreover, the protection component 304 can delay operation of the gate driver 206 until these conditions are satisfied (e.g., Vin-Vo=0, or Vin-Vo=predetermined threshold voltage value). As an example, the predetermined threshold value can be set by a manufacturer or can be defined and/or dynamically adjusted by a customer/user. Once conditions associated with the load voltage (Vo) and/or the source voltage (Vin) (e.g., undervoltage and overvoltage) are satisfied, the protection component 304 can enable the gate driver 206, which in turn can instantaneously or almost instantaneously turn on all the MOSFET(s) within the hot swap control system. In particular, the instantaneous or almost instantaneous switching of the MOSFET(s) prevents linear mode operation. In other words, the MOSFET(s) remain switched off until the output voltage V0 ramps up to a predefined voltage value. Moreover, the feedback component 106 provides a startup delay before turning on the MOSFET(s) and ensures that the MOSFET(s) do not operate in the linear region(s). Typically, gate driver 206 can enable the load at the same time as or after the MOSFET(s) are switched on.

Additionally or optionally, the feedback component 106 can include a current sensing component 306 that can be employed to monitor the load current, during normal operation (e.g., after the load is enabled). The protection component 304 can compare the sensed load current with a predetermined overcurrent threshold (e.g., set by a manufacturer and/or set/modified by a customer/user) and can disable the gate driver 206, if the sensed load current is greater than or equal to the predetermined overcurrent threshold. On disabling the gate driver 206, the MOSFET(s) within the hot swap control system can be instantaneously or almost instantaneously turned off. In this regard, the hot swap control system and/or the down-streaming load can be protected against overcurrent. In one aspect, the current sensing component 306 can sense current ($I_{R2}$) flowing through a dedicated current sense resistor (R2). In another aspect, the voltage sense from $Rds_{ON}$ of the MOSFET(s) provides both overcurrent and the voltage difference between source and load.

It can be appreciated that the voltage sensing component 302, protection component 304, and the current sensing component 306 can include most any electrical circuit(s) that can include components and/or circuitry elements of any suitable value in order to implement aspects of the subject specification. For example, the protection component 304 can include comparators and can operate in the analog or digital domain. Further, the gate driver 206 can include most any circuit that can generate an output signal, which instantaneously or almost instantaneously switches between low (e.g., ground) and high (e.g., Vcc) voltages.

Figure 4:
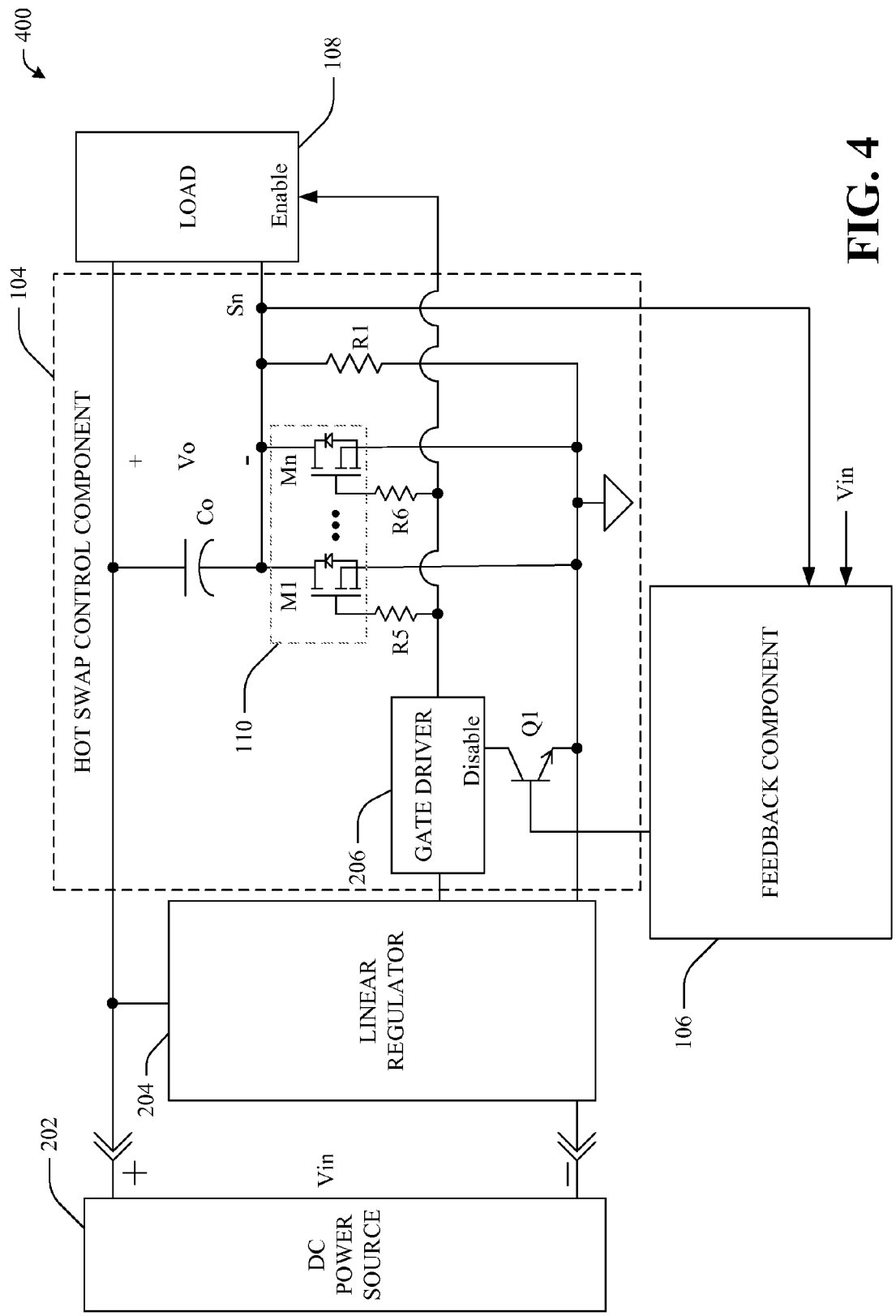
FIG. 4 illustrates an example implementation of reliable and efficient hot swap controller.

FIG. 4 illustrates another example circuit diagram 400 for implementing a reliable and efficient hot swap controller in accordance with an aspect of the specification. Circuit 400 is substantially similar to circuit 200, described above, except that in circuit 400 the MOSFET(s) 110 and current limiting resistor R1 are connected directly to ground. Moreover, circuit 400 does not utilize a dedicated current sense resistor (R2) to detect overcurrent. It can be appreciated that the DC power source 202, feedback component 106, load 108, MOSFET(s) 110, linear regulator 204, gate driver 206, and current limiting resistor R1, can include functionality, as more fully described herein, for example, with regard to circuit 200 and system 100 and 300.

Circuit 400 is employed to limit an inrush current surge during initial turn on of the DC power supply 202. Moreover, the circuit 400 ensures reliable current sharing by the MOSFETs 110 and prevents the MOSFETs 110 from operating in a linear mode. During the linear mode, the MOSFETs 110 operate like a resistor with a variable resistance that is controlled by the gate voltage relative to both the source and drain voltages. As resistance varies, the current through the MOSFETs 110 can also vary and the load current can be distributed unequally between the MOSFETs 110. In contrast, circuit 400 introduces a delay (via feedback component 106) to switch on the MOSFETs 110. Moreover, the gate driver 206 can be enabled after load voltage V0 reached a preset threshold. According to an aspect, the output of the gate driver 206, coupled to the gate of MOSFETs 110, switches from a low voltage to a high voltage, instantaneously or substantially instantaneously, such that the MOSFETs 110 do not operate within their linear regions.

During steady state, when all MOSFETs 110 are turned on, the MOSFETs operate as resistors with respective resistances $Rds_{ON-1}$ to $Rds_{ON-n}$. In one implementation, the feedback component 106 can sense a voltage across $Rds_{ON}$ of the MOSFETs 110 and determine whether a load current corresponding to the voltage is greater than a preset threshold. If the load current is determined to be greater than the threshold value, the gate driver 206 is disabled, which in turn switches off the MOSFETs 110 and/or the load 108. Alternatively, if load current is determined to be less than the threshold value, the gate driver 206 remains enabled and the system operates in steady state. Accordingly, the voltage sensed from $Rds_{ON}$ of the MOSFETs 110 provides both overcurrent and inrush current protection. The load current sensing technique on $Rds_{ON}$ of the MOSFETs 110 may provide an approximate value (e.g., ±20-30%) due to the temperature dependence of $Rds_{ON}$; however, the circuit 400 further reduces system costs by eliminating the resistor R2. As an example, for applications that can accept approximate values for current sensing, circuit 400 can be utilized to save costs of additional current sensing resistor; while, for applications that require precise values for current sensing, circuit 200 can be utilized.

Figure 5:
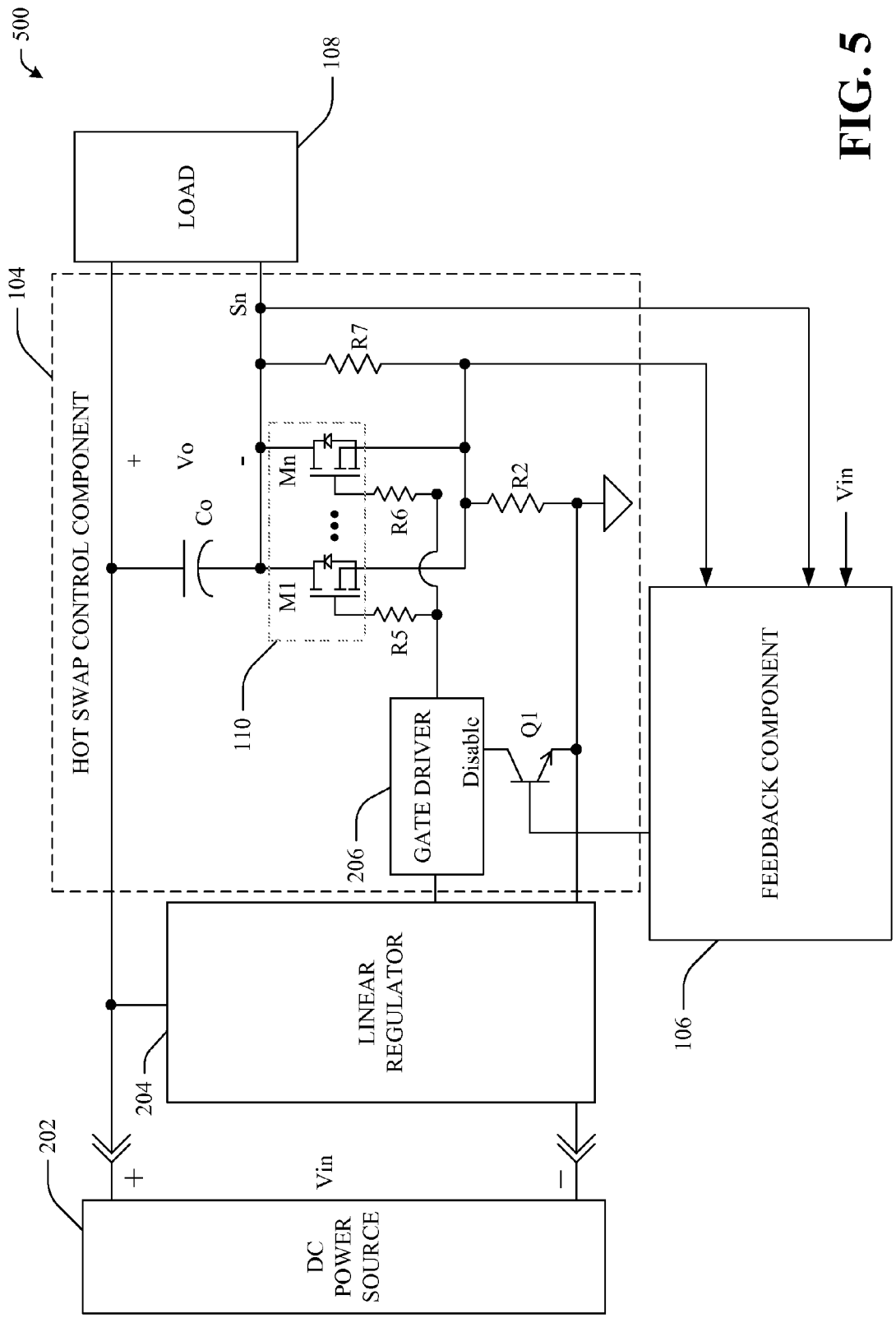
FIG. 5 illustrates another example implementation of reliable and efficient hot swap controller.

Referring to FIG. 5, there illustrated is yet another example low cost circuit 500 for reliable hot swap control in accordance with an aspect of the subject system. Typically, circuit 500 can be utilized for various applications, for example, Interface for Board Control (IBC) designs, server board designs, etc. Circuit 500 includes a hot swap control component 104 comprising a set of paralleled MOSFETs (M1-Mn) 110 implemented in parallel to distribute the load current. As an example, if n=5, and load current is 250 A, a 50 A current can flow through each MOSFET. Since the circuit 500 ensures that MOSFETs 110 do not operate in the linear mode, reliable current sharing can be achieved between the MOSFETs 110 and low cost and/or low rating MOSFETs (e.g., having a maximum current rating of 50 A for the above example) can be utilized in the circuit 500.

Typically, the load 108 is enabled at the same time as or after (e.g., by employing most any delay element) switching on the MOSFETs 110. In this example implementation, the load 108 does not include a dedicated enable pin. In case an enable pin is not available, a low impedance resistor R7 (e.g. as compared to the higher impedance resistor R1 utilized in circuits 200 and 400) can be utilized. Although illustrated in FIG. 5, it can be appreciated that circuit 500 may not include a current sense R2 (e.g. as depicted and described with respect to circuit 400). Moreover, the operation of circuit 500 is similar to the operation of circuits 200 and/or 400, except that the gate driver 206 does not directly enable/disable the load 108 in circuit 500. In general, feedback component 106 senses voltage at node Sn, and/or current through resistor R2 to provide inrush current limiting and/or overcurrent protection respectively.

Figure 6:
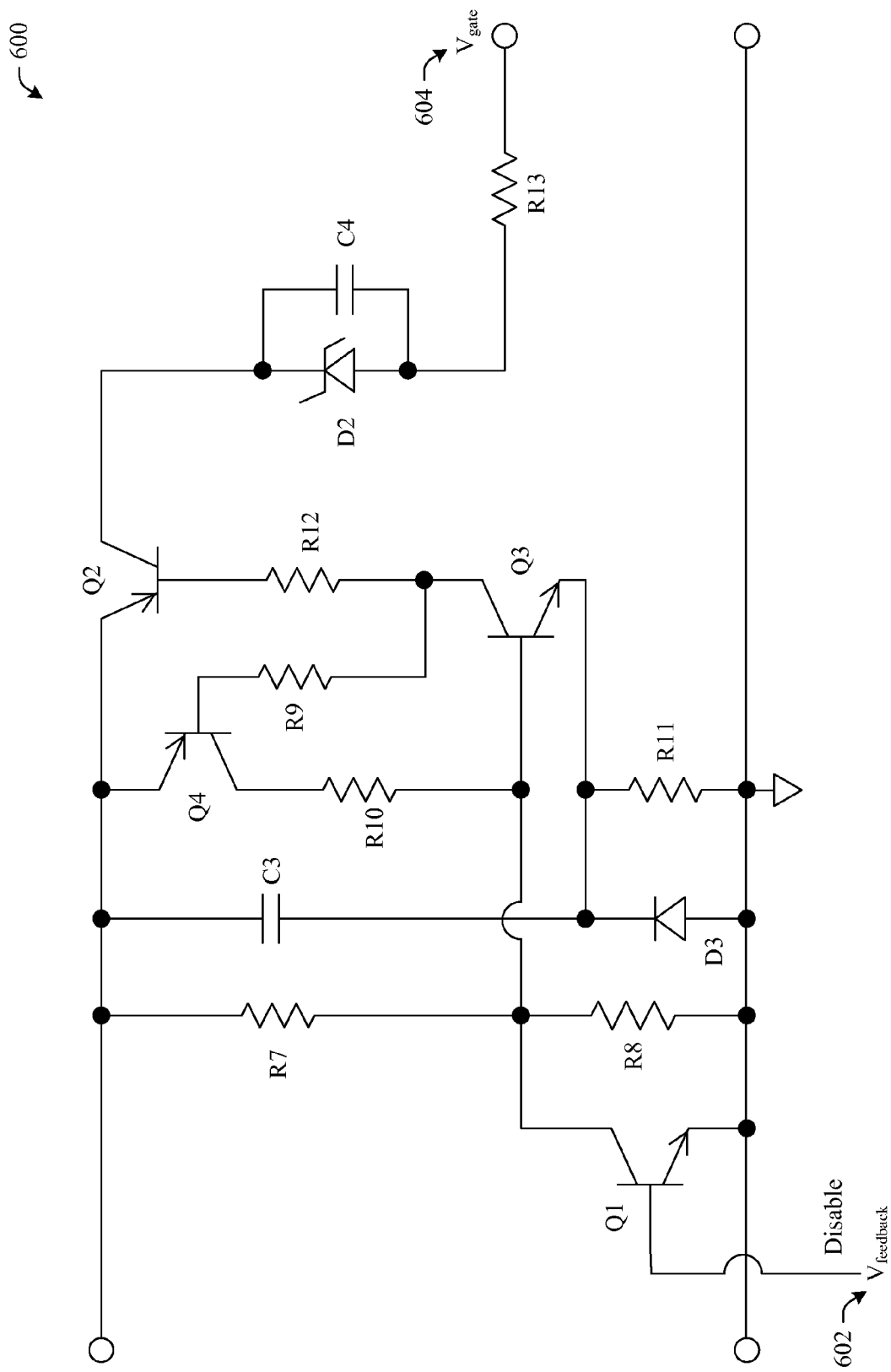
FIG. 6 illustrates an example circuit of a gate driver utilized to control the switching of MOSFETs in a hot swap controller.

Referring now to FIG. 6, there illustrated is an example circuit 600 for a gate driver (e.g. gate driver 206) utilized to control switching of the MOSFETs in a hot swap controller, according to an aspect of the subject disclosure. In particular, when a load is connected to a DC power supply, the circuit 600 introduces a delay (e.g., until load voltage is equal to power supply voltage) before turning on the MOSFETs. In addition, the output voltage ($V_{gate}$) 604 of the gate driver circuit 600, switches from low to high or vice versa, instantaneously (or approximately instantaneously). Accordingly, the MOSFETs are not operated in linear mode.

In one aspect, the circuit 600 can be disabled by $V_{feedback}$ signal 602. The $V_{feedback}$ signal 602 is generated by the feedback circuit 106 as a function of inrush current, undervoltage and/or overcurrent detection. As described in detail supra, the $V_{feedback}$ signal 602 is kept high and circuit 600 is disabled until the difference between a supply voltage and a load voltage is greater than a threshold value. As the load voltage gradually increases, the difference between the supply voltage and the load voltage equals the threshold value and the circuit 600 is enabled (e.g., $V_{feedback}$ signal 602 is low). Accordingly, the voltage Vgate instantaneously (or approximately instantaneously) increases from low to high, switching on the MOSFETs (and the load) at the same time. Further, if an overcurrent is detected (e.g., by the feedback component), the circuit 600 is disabled (e.g., $V_{feedback}$ signal 602 is high) and accordingly the output voltage ($V_{gate}$) 604 drops from high to low instantaneously (or approximately instantaneously).

Although circuit 600 is illustrated to comprise resistors R7-R13, capacitors C3-C4, transistors Q1-Q4, zener diode D2 and diode D3, it can be appreciated that most any circuit comprising most any electrical elements can be utilized to generate the output voltage ($V_{gate}$) 604. Alternatively, a commercially available (e.g., third party) gate driver IC can be utilized to implement gate driver 206.

Figure 7:
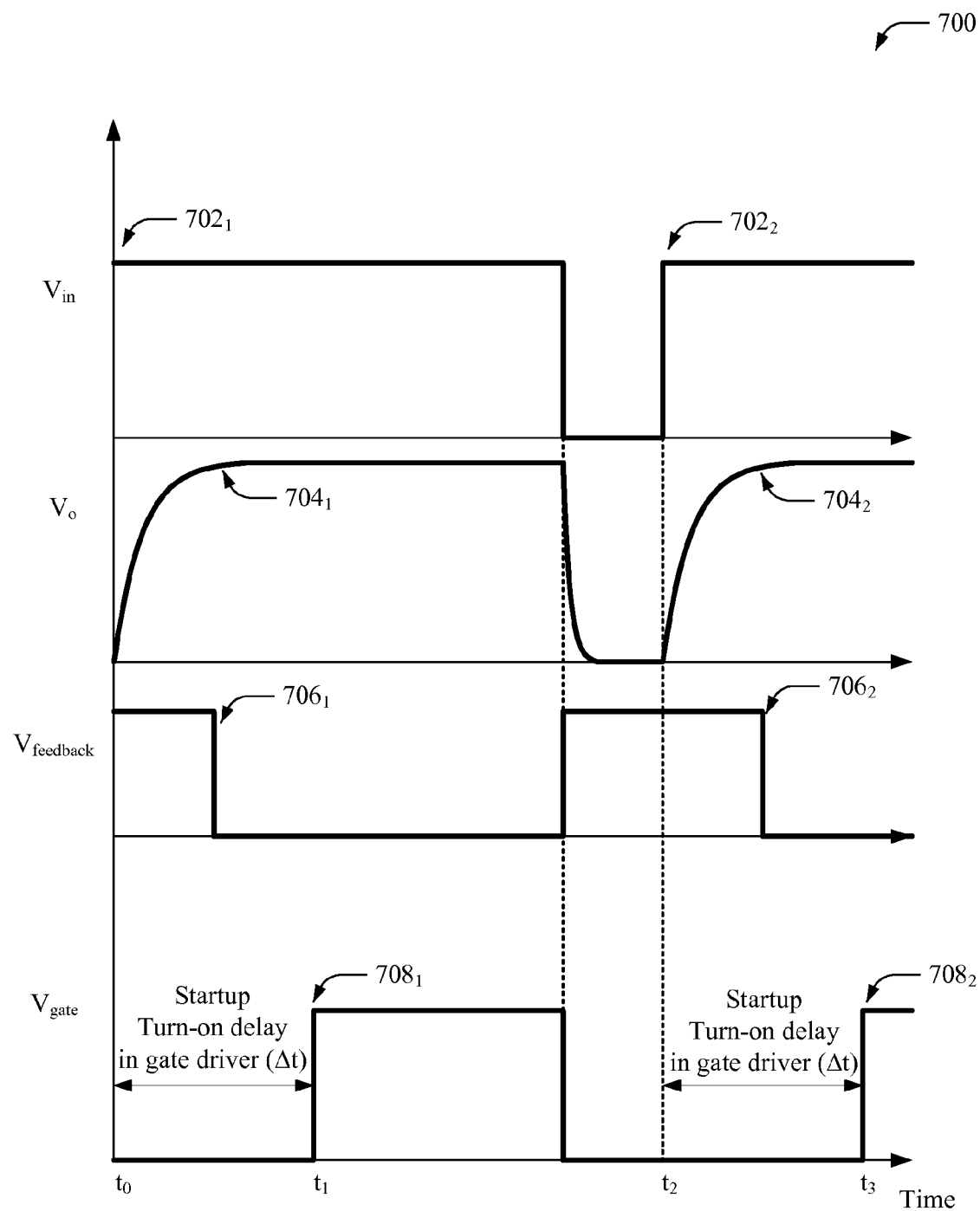
FIG. 7 illustrates example waveforms that depict voltages at various nodes in a hot swap control system.

FIG. 7 illustrates example waveforms 700 at various nodes in circuits 200, and 400-500 in accordance with an aspect of the subject disclosure. Moreover, Vin is the voltage signal output by the DC power source 202, Vo is the load voltage across capacitor Co, $V_{feedback}$ is the voltage signal output by the feedback component 106, and $V_{gate}$ is the voltage signal output by the gate driver 206. According to an aspect, when the DC power source 202 is switched on, for example at $t_0$ and $t_2$, Vin switches from low to high at 702$_1$ and 702$_2$. Accordingly, the capacitor Co begins to charge and the voltage Vo across the capacitor Co begins to increase. As Vo increases, the difference between source voltage Vin and Vo reduces, and at 704$_1$ and 704$_2$, Vin-Vo is equal to (or approximately equal to) zero. As an example, until Vin-Vo≈0, the gate driver 206 and in turn the MOSFETs 110 are disabled/switched off. During this time, the $V_{feedback}$ output by the feedback component 106 can be high, disabling the gate driver 206. Once the feedback component 106 determines that Vin-Vo is equal to (or approximately equal to) zero (or a preset threshold value), at 706$_1$ and 706$_2$, a low signal (e.g., ground) is output at $V_{feedback}$ to enable the gate driver 206 (e.g., since $V_{feedback}$ is coupled to a disable input of the gate driver). Typically, once the gate driver is enabled, at $t_1$ and $t_3$, the Vgate signal instantaneously or almost instantaneously rises from low to high, as seen by the sharp edge at 708$_1$ and 708$_2$. Moreover, a startup delay ($\Delta t = t_1 - t_0$ or $t_3 - t_2$) is introduced before enabling the gate driver 206 (and thus the MOSFETs 110). In one example, the startup delay can be a function of Vin-Vo. Typically, as Vgate becomes high at 708$_1$ and 708$_2$, the MOSFETs 110 are turned on simultaneously. In addition, the load can be enabled at the same time as or after the MOSFETs 110 have been turned on. Further, on detection of under voltage, both MOSFETs 110 and load 108 can be turned off.

Figure 8:
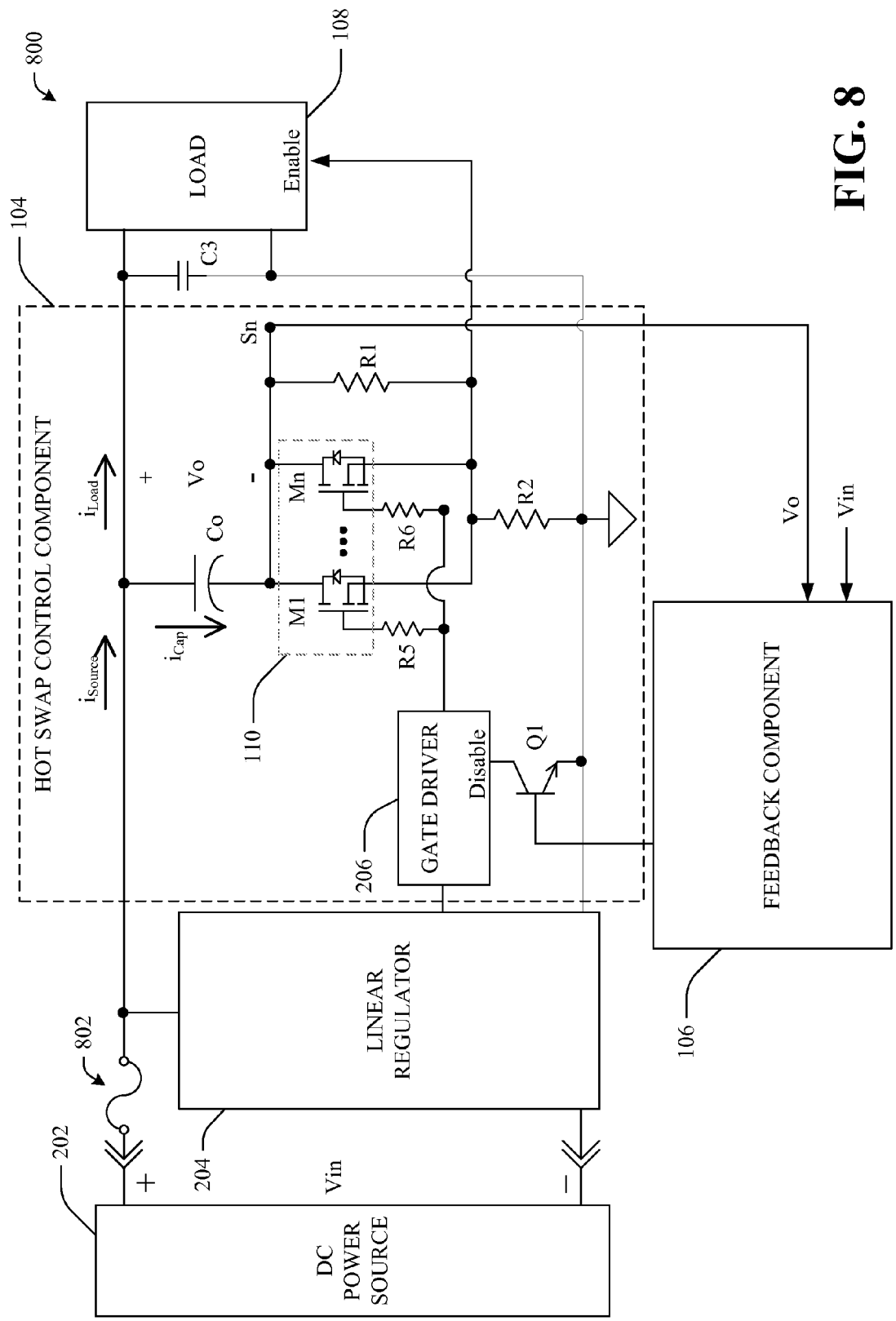
FIG. 8 illustrates an example system for reducing power loss in paralleled MOSFETs of a hot swap controller.

Referring now to FIG. 8, there illustrated is an example system 800 for reducing power loss in the paralleled MOSFETs, according to an aspect of the subject disclosure. System 800 operates similar to systems 100, 200, 400, and 500 described above, except that the load 108 is directly connected to the DC power source 202, and MOSFETs 110, controlling hot swap, are coupled in series with the capacitor Co. Accordingly, the capacitor current flows through and is shared by the MOSFETs 110. Similar to the operation of systems 100, 200, 400, and 500, the feedback component analyzes the output voltage (Vo) and DC source voltage (Vin) to control operation of the gate driver 206, which in turn ensures that the MOSFETs 110 do not operate in linear region.

According to an aspect, the load 108 is directly coupled to the DC power source 202. With this connection, even if the MOSFETs 110 are opened (e.g., switched off), load 108 is not disconnected. Moreover, although the MOSFETs 110 are opened, the DC source 202 can still deliver current to the load 108. As an example, system 800 can be utilized within data centers and/or server farms, wherein the load 108 includes a DC-DC power converter utilized in a power supply. Initially, the load 108 (e.g., DC-DC power converter) is inserted onto a common DC bus and the hot swap control component 104 is utilized to mitigate high inrush load current during the startup stage. Moreover, when the DC power source 202 is connected to the load 108, the inrush current limited due to resistor R1. In one example, the limited current charges the output capacitor Co and the MOSFETs 110 are enabled when a difference between a voltage across the input power source and a voltage across the output capacitor is less than the predetermined value. Typically, the hot swap control component 104 is typically required only during this initial startup stage. The hot swap control component 104 of system 800 is implemented in a manner, such that, power consumption during normal operation (e.g., after the initial startup stage), is significantly lower (e.g., than that in hot swap control component 104 of systems 100, 200, 400, and 500). Since power consumption is reduced, efficiency of the load 108 is significantly increased.

In general, the current flowing through the MOSFETs 110 is low and accordingly, power consumption is reduced. In particular, the source current ($I_{source}$) includes an AC and DC component. The MOSFETs 110 are coupled in series with the output capacitor Co and receive the current flowing through the capacitor Co ($i_{Cap}$). Moreover, the capacitor Co passes only the AC component, while the DC and AC components ($i_{Load}$) flow through the load 108. Accordingly, only a small AC current is shared by the MOSFETs 110 and thus power consumption ($i_{rms}^2 * rds_{on}$) is low. In systems 100, 200, 400, and 500 the entire load current flows through the MOSFETs 110. In contrast, only the AC component flows through the MOSFETs 110 in system 800. Since the root means square (RMS) current through the capacitor Co (and thus MOSFETs 110) is always less than the load current, the power consumed by the MOSFETs 110, which is a function of the square of the RMS current and the on-resistance ($rds_{on}$) of the MOSFETs 110, is reduced.

In addition, since magnitude of the current flowing through the MOSFETs 110 is lower, a fewer number of MOSFETs 110 can be utilized (as compared to the number of MOSFETs 110 utilized in systems 100, 200, 400, and 500). Not only does the reduction in current flowing through the MOSFETs 110 increase efficiency of the hot swap control component 104, but also protects the MOSFETs 110 from damage (e.g., due to high currents). In one aspect, since the load 108 is directly connected to the DC power source 202, overcurrent protection (OCP) can be implemented in the load 108. For example, in case of a component failure in the load 108, a fuse 802 on the input terminal can blow and disconnect the load 108 from the DC power source 202.

Further, system 800 provides a turn-off delay for MOSFETs 110. Typically, when the DC power source 202 is switched off or removed, a negative current flows from load 108 to the DC power source 202. In one aspect, the turn-off delay enables the MOSFETs 110 to remain switched on after the source voltage (Vin) becomes zero to provide a path for the negative current and avoid damage to the load 108. According to an implementation, the feedback component 106 can monitor the source voltage (Vin) and the output voltage (Vo), and determine whether the source voltage (Vin) is zero (or below a predefined threshold) and/or determine whether the difference between the source voltage and the output voltage (Vin-Vo) is within a predefined range. During this period, the feedback component 106 can ensure that the gate driver 206 is enabled and the MOSFETs 110 remain switched on. If the MOSFETs 110 are switched on, the negative current can flow though the MOSFETs 110. After the predefined period, the feedback component 106 can disable the gate driver 206 (e.g., on detection of under voltage), which in turn can switch off the MOSFETs 110.

Although a dedicated sense resistor R2 is illustrated in system 800, it can be appreciated that the MOSFETs 110 and current limiting resistor R1 can be connected directly to ground. Moreover, current can be sensed through either resistor R2 or the on-resistance ($Rds_{on}$) of the MOSFETs 110. Further, a load without a dedicated enable pin can also be utilized in system 800. In one example, overcurrent can cause the gate driver 206 to disable the MOSFETs 110 and the load 108. Furthermore, it can be appreciated that the resistors R1-R13 utilized in circuits 200, 400-600, and 800 can have suitable resistance values or ratios depending on the application. Further, capacitors Co and C2-C4 in circuits 200, 400-600, and 800 can have suitable capacitance values (or ratios) depending on the application.

Figure 9A:
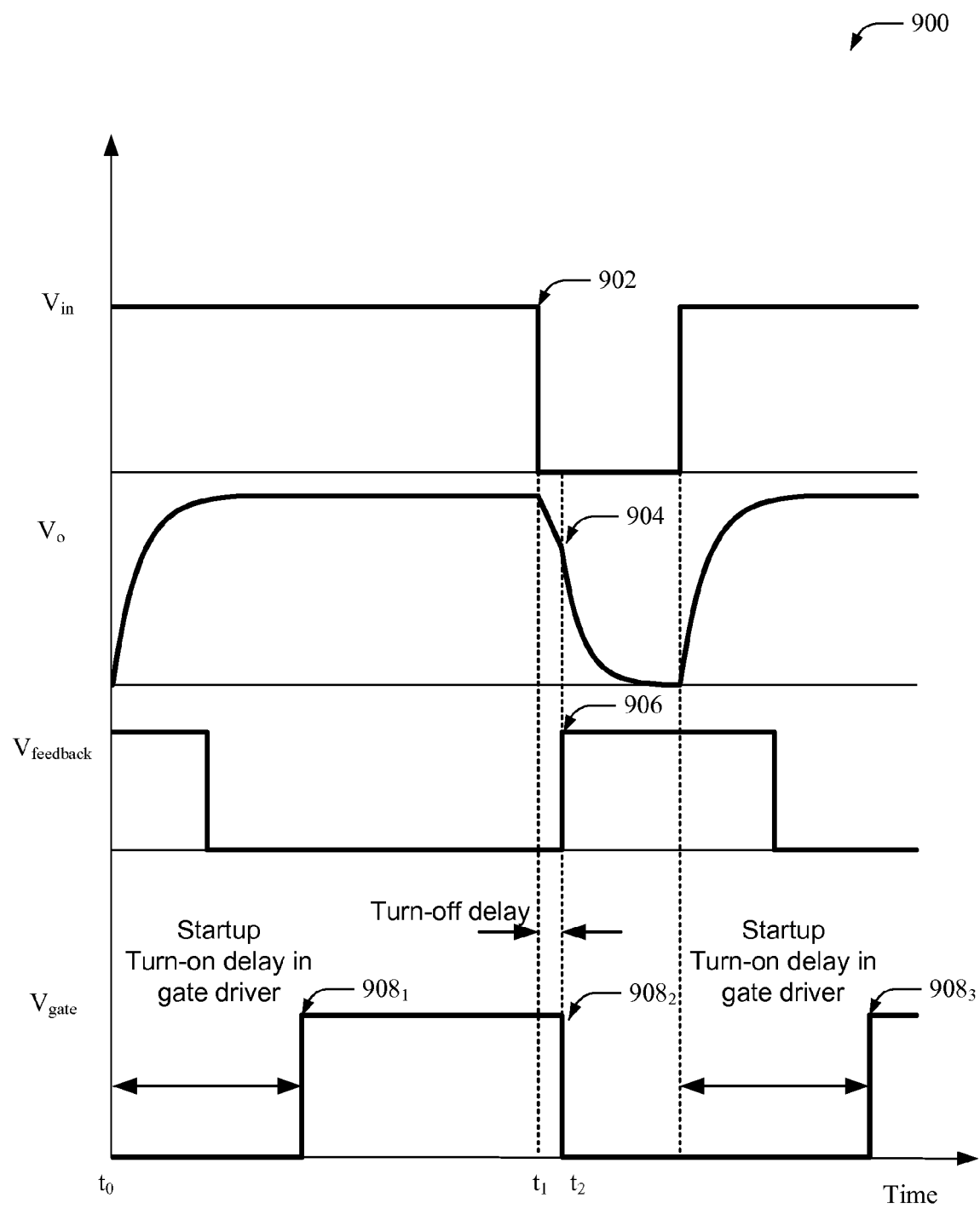
FIGS. 9A-B illustrate example waveforms that depict voltages and currents at various nodes in a hot swap control system.
Figure 9B:
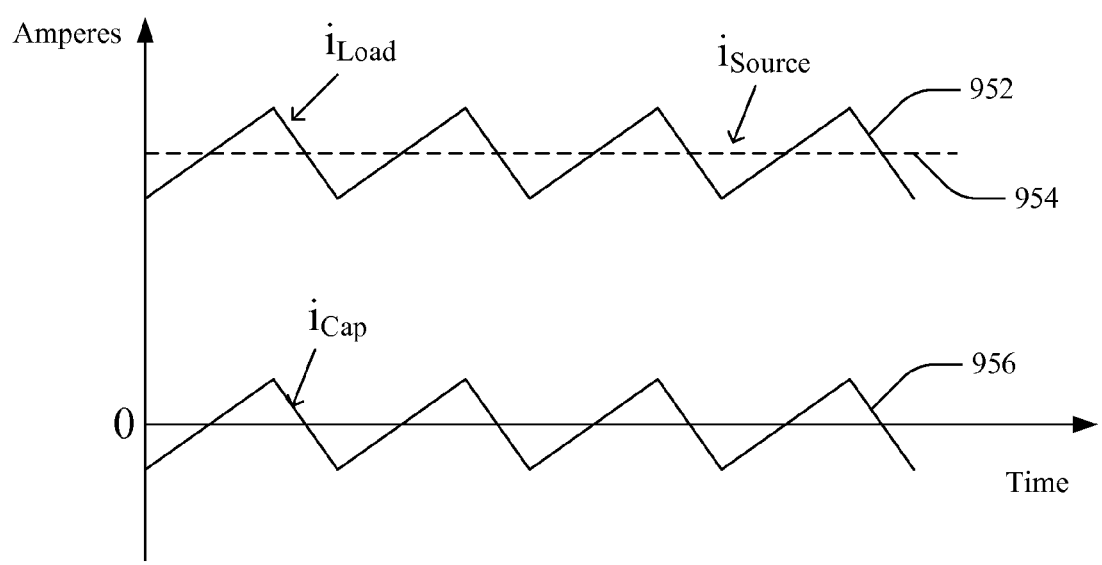

FIGS. 9A and 9B illustrate example waveforms at various nodes in circuit 800 in accordance with an aspect of the subject disclosure. Specifically, FIG. 9A illustrates voltage signals at different nodes of system 800 over time. For example, Vin is the voltage signal output by the DC power source 202, Vo is the load voltage across capacitor Co, $V_{feedback}$ is the voltage signal output by the feedback component 106, and $V_{gate}$ is the voltage signal output by the gate driver 206. Typically, when the DC power source 202 is switched on, the feedback component 106 waits for a predefined time (e.g., a turn-on delay) before enabling the gate driver 206 and accordingly MOSFETs 110. Moreover, the Vgate signal instantaneously or almost instantaneously rises from low to high or instantaneously or almost instantaneously falls from high to low, as seen by the sharp edge at $908_1$, $908_2$, and $908_3$, and thus ensures that the MOSFETs 110 do not operate in a linear mode. Similar to waveforms 700, as Vgate becomes high at $908_1$ and $908_2$, the MOSFETs 110 are turned on simultaneously. Additionally or optionally, the load 108 can be enabled at the same time as or after the MOSFETs 110 have been turned on.

According to an aspect, when the DC power source 202 is removed or turned off, at 902, the source voltage Vin reduces (e.g., falls to zero). The feedback component 106 detects the decrease in source voltage at 902, for example below a predefined threshold, and disables the gate driver 206, at 906, after a turn-off delay ($t_2-t_1$). Accordingly the Vgate signal instantaneously or almost instantaneously falls from high to low at $908_2$, switching off the MOSFETs 110. During the turn-off delay ($t_2-t_1$), the MOSFETs 110 remain turned on to provide a path for a negative current flowing from the load 108 to the source 202 (if any).

FIG. 9B illustrates example current signals 950 flowing through various elements of system 800. Typically, the load 108 operates like an on-off switch and thus the currents ($i_{Load}$, $i_{Source}$, and $i_{Cap}$) can have a triangular waveform. Although not shown, it can be appreciated that currents having a pulse waveform with high frequencies can also be observed. In one aspect, the MOSFETs 110 are coupled in series with the capacitor Co and the load 108 is directly coupled to the DC power source 202. Accordingly, the capacitor current $k_{Cap}$ (956) flows through MOSFETs 110.

The load current $i_{Load}$ (952) contains DC and AC components. The DC component becomes a source current $i_{Source}$ (954), while the AC component flows through the capacitor Co (956). Thus, the conduction loss in MOSFETs 110 is significantly low, since only small AC current (956) flows through the MOSFETs 110 (instead the entire load current 952). Moreover, the low conduction loss improves the power efficiency of the load 108 and protects the MOSFETs 110 from damage due to high currents.

FIGS. 10-13 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 10:
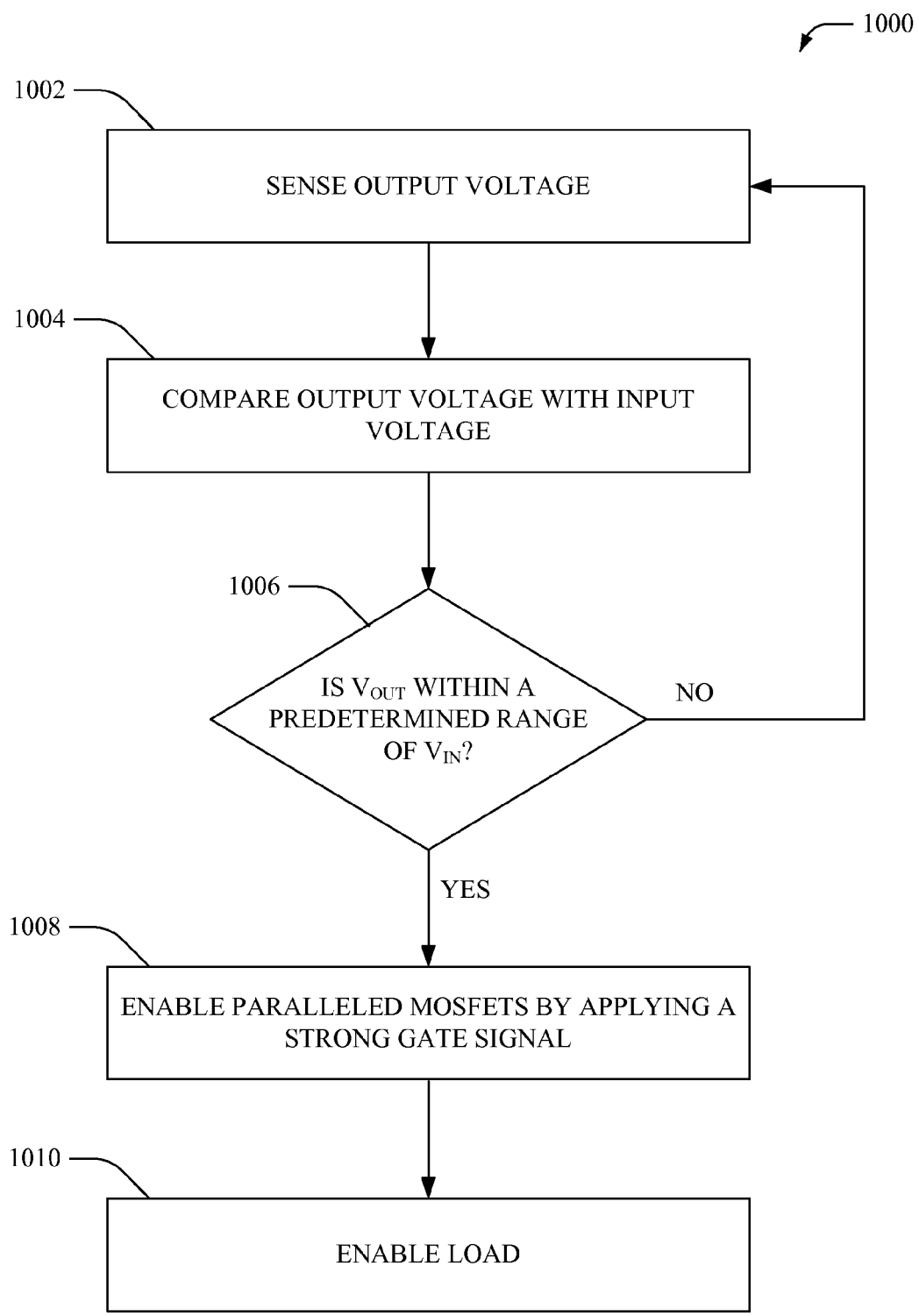
FIG. 10 illustrates an example methodology for limiting inrush current during the startup period.

Referring to FIG. 10 there illustrated is a methodology 1000 for limiting inrush current during startup, according to an aspect of the subject innovation. As an example, methodology 1000 can be utilized in various hot swap applications, such as, but not limited to, distributed power systems, high availability servers, disk arrays, powered insertion boards, etc. Moreover, hot swap control is provided to prevent inrush current surges when a power supply is coupled to a load (e.g., a line card is plugged into a live backplane). Specifically, methodology 1000 enables utilization of a wide selection of MOSFETs to provide reliable hot swap control.

Initially, the power supply can be switched on and/or connected to the load. At 1002, output voltage, for example, across the load, can be sensed. Typically, the output voltage gradually increases from zero to power supply voltage. During this time, paralleled MOSFETs in the hot swap controller are switched off and/or the load is disabled, to prevent a large inrush current flowing through the MOSFETs and/or the load. At 1004, the output voltage can be compared with the input voltage (e.g., voltage provided by the power supply). Moreover, at 1006, it can be determined whether the output voltage is equal to the input voltage (or within an acceptable range). In one aspect, if determined that the output voltage is not yet equal to the input voltage, the methodology continues sensing the output voltage at 1002. Alternately, if determined that the output voltage is equal to the input voltage, at 1008, the paralleled MOSFETs are enabled by applying a strong gate signal. Specifically, the strong gate signal, applied to the gates of the paralleled MOSFETs, switches from low to high, instantaneously or substantially instantaneously, preventing linear mode operation. Further, at 1010, the load can be enabled, for example at the same time as or after (e.g., by introducing a delay) switching on the paralleled MOSFETs. Accordingly, methodology 1000 waits until the output voltage is equal to the input voltage before switching on the paralleled MOSFETs and load and thus protects the paralleled MOSFETs and load from inrush current surges.

Figure 11:
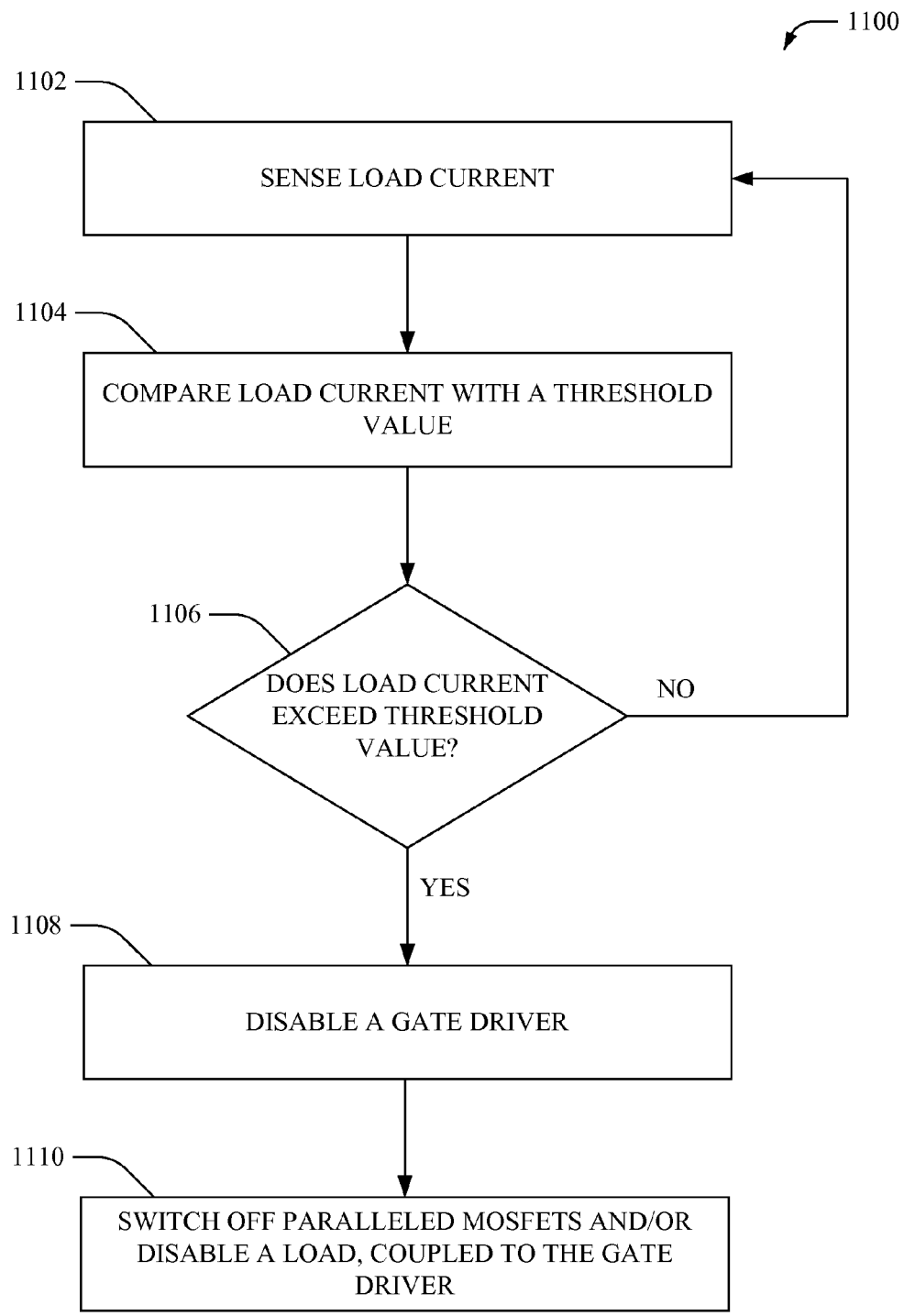
FIG. 11 illustrates an example methodology for reliable overcurrent protection in a hot swap controller.

FIG. 11 illustrates an example methodology 1100 for reliable overcurrent protection in a hot swap controller in accordance with an aspect of the subject disclosure. Typically, when a power supply is connected to a load, a delay can be introduced prior to enabling MOSFETs within the hot swap controller and/or a load (e.g., DC-DC converter). After the MOSFETs and load are enabled, at 1102, the load current can be sensed. In one example, a current sense resistor can be employed to monitor load current. In another example, the load current can be identified based on voltage across $Rds_{ON}$ of the MOSFETs. At 1104, the load current can be compared with a threshold value. As an example, the threshold value can be predefined and/or dynamically adjusted. In addition, the threshold value can include an acceptable current range of load current for efficient operation.

Further, at 1106, it can be determined whether the load current exceeds the threshold value. Moreover, if the load current does not exceed the threshold value, for example, if load current is within the acceptable current range, then the methodology 1100 continues sensing the load current at 1102. Alternately, if the load current exceeds the threshold value, an overcurrent condition is identified and at 1108, the gate driver is disabled. Furthermore, at 1110, the paralleled MOSFETs and/or load coupled to the gate driver are switched off/disabled.

Figure 12:
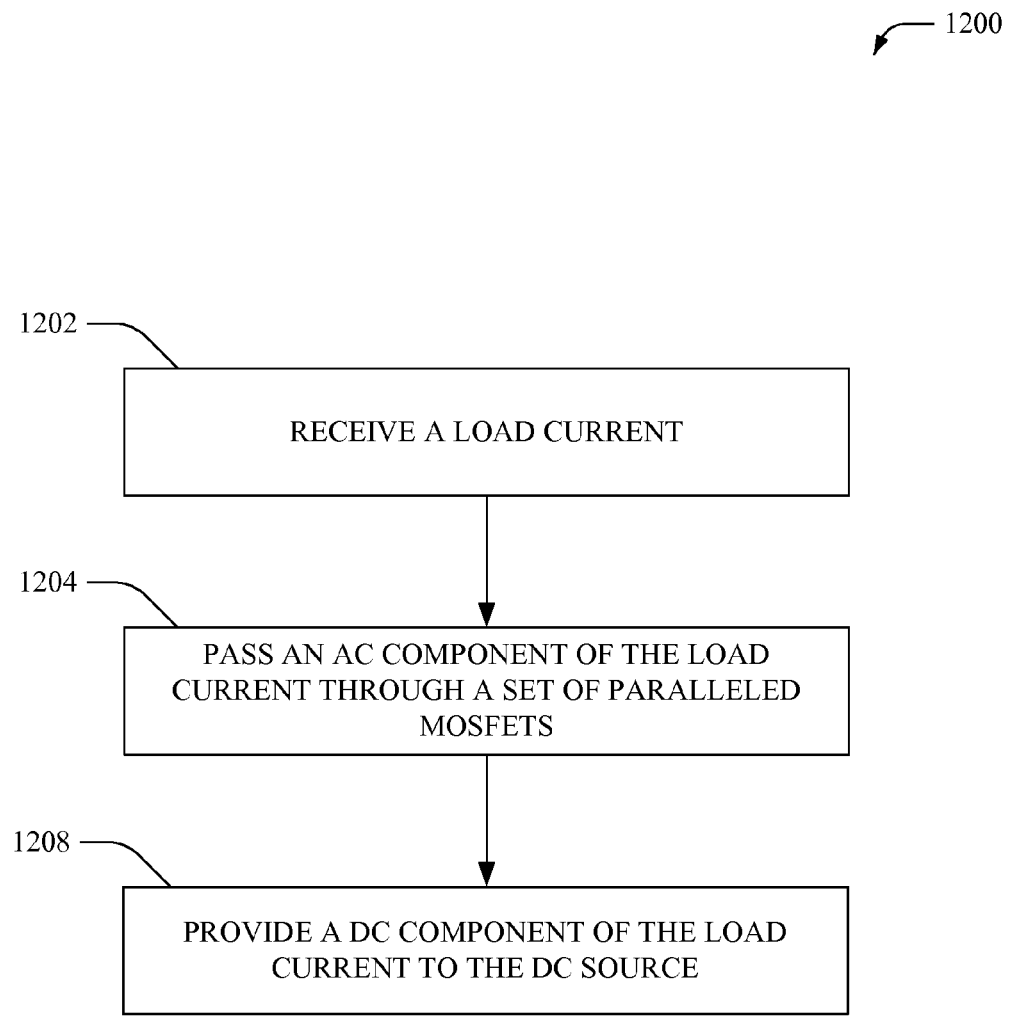
FIG. 12 illustrates an example methodology for lossless hot swapping in a power system.

FIG. 12 illustrates an example methodology 1200 for lossless hot swapping in a power system, according to an aspect of the subject specification. Methodology 1200 can typically be employed during supplying power to data centers, server farms, and the like. Typically, a set of paralleled MOSFETs can be utilized within a hot swap control unit to share an output current. In one aspect, the MOSFET(s) can be coupled in series with an output capacitor and the load can be directly coupled to the input power source. At 1202, a load current, for example, comprising an AC and a DC component, can be received. At 1204, the AC component can be passed through the set of paralleled MOSFETs and at 1208, the DC component can be provided to the DC source. Moreover, since the RMS value corresponding to the AC component is substantially lower than the total load current, the MOSFETs consume less power (power consumed is directly proportional to a square of the RMS value). In addition, the magnitude of the AC component is lower than that of the total load current, a fewer number of MOSFETs can be coupled in parallel.

Figure 13:
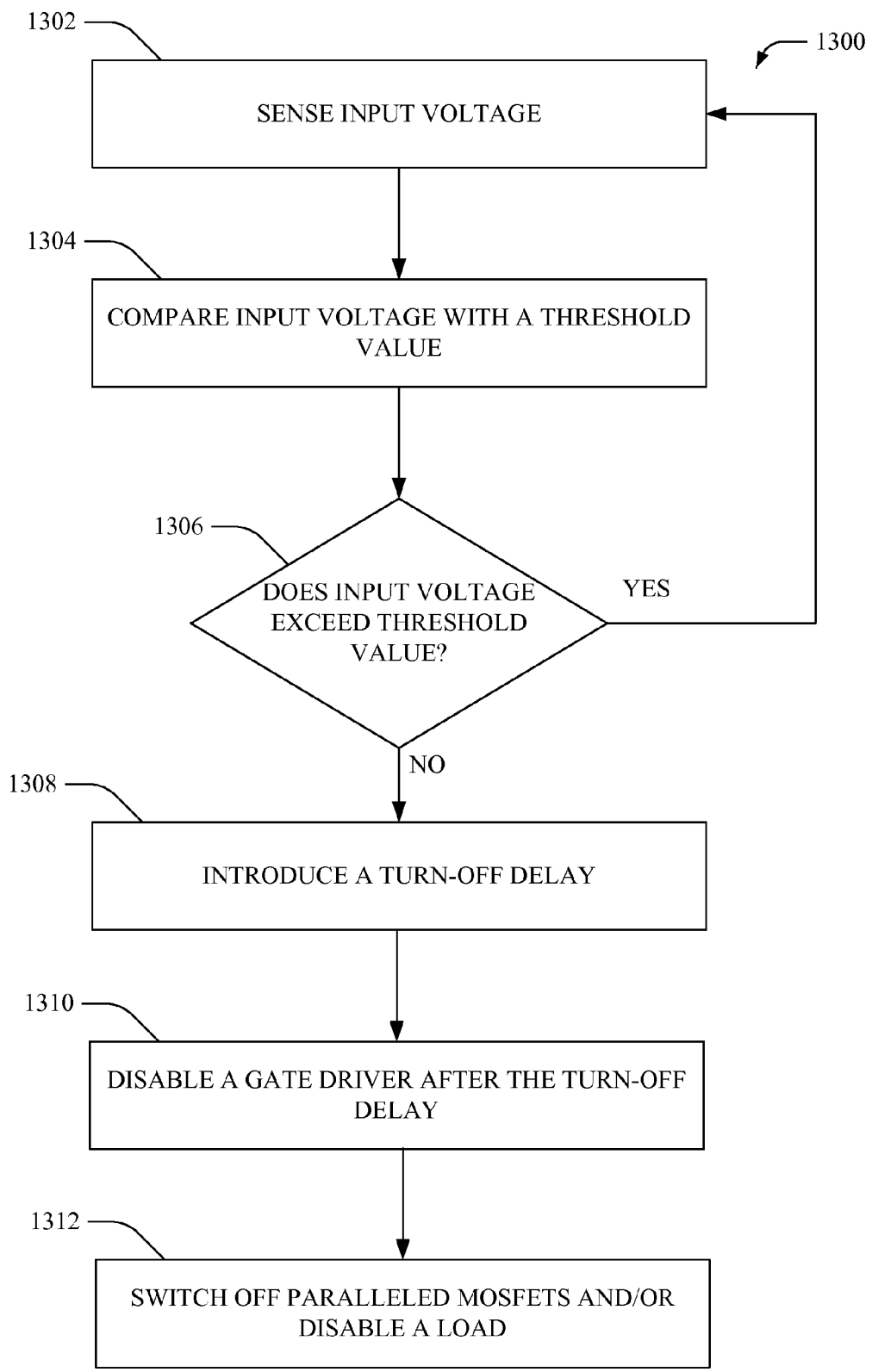
FIG. 13 illustrates an example methodology for negative current protection in a hot swap controller.

Referring now to FIG. 13, there illustrated is an example methodology 1300 for negative current protection in a hot swap controller in accordance with an implementation. When source voltage (Vin) reduces below a threshold value, for example, if the input power source is switched off or removed, a negative current flows from the load to the source. If a current path (to ground) is not provided, the negative current can significantly damage the load. Methodology 1300 provides negative current protection, which prevents load damage. In one aspect, at 1302, input voltage is sensed. At 1304, the input voltage is compared to a threshold value (e.g., ground, 0V, etc.). Further, at 1306, it can be determined whether the input voltage exceeds the threshold value. If the input voltage exceeds the threshold value, the methodology 1300 continues sensing the input voltage at 1302. Alternately, if the input voltage does not exceed the threshold value, for example, Vin=0, at 1308 a turn-off delay is introduced. As an example, the turn-off delay, based on under voltage, can include a predefined or dynamically determined period of time during which a negative load current can be absorbed. At 1310, the gate driver can be disabled after the turn-off delay. In other words, the gate driver remains enabled (and thus the MOSFETs remain switched on) for the duration of the turn-off delay. Accordingly, the negative load current can flow though the MOSFETs to ground. Moreover, at 1312, the paralleled MOSFETs can be switched off and/or the load can be disabled on expiration of the turn-off delay.

What has been described above includes examples of the implementations. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated implementations of the subject disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A power supply, comprising:
   at least one field effect transistor (FET) coupled between an input power source and a load that is in an unpowered state;
   a controller configured to operatively control the at least one FET based on a difference between a voltage across the input power source and a voltage across the load,
   the controller configured to provide a current path to power the load by way of the at least one FET if the difference between the voltage across the input power source and the voltage across the load is below a predetermined threshold; and
   an output capacitor coupled in series with the at least one FET, wherein the series combination of the output capacitor and the at least one FET is coupled in parallel with the load and in parallel with the input power source, and wherein the output capacitor blocks a direct current (DC) component of a load current being passed through the at least one FET.

2. The power supply of claim 1, wherein: the controller includes a voltage sensing component configured to sense at least one of the voltage across the load or the voltage across the input power source.

3. The power supply of claim 1, wherein: the controller includes a driver circuit configured to generate a signal that switches the at least one FET between on and off operational states; and
   the driver circuit is configured to prevent operation of the at least one FET in a linear mode.

4. The power supply of claim 3, wherein: the controller includes a protection component configured to determine if the difference between the voltage across the load and the voltage across the input power source is below the predetermined threshold.

5. The power supply of claim 4, wherein the controller is configured to disable the driver circuit if the difference between the voltage across the load and the voltage across the input power source exceeds the predetermined threshold.

6. The power supply of claim 4, wherein the controller is configured to enable the driver circuit, if the difference between the voltage across the load and the voltage across the input power source is below the predetermined threshold.

7. The power supply of claim 3, wherein the controller includes:
   a current sensing component configured to detect an overcurrent condition based on at least one of a voltage across the at least one FET or a current flowing through a sense resistor; and
   an inrush current limiting resistor configured to provide a path for a current charging an output capacitor coupled across the load,
   wherein the controller disables the driver circuit in response to the detection of at least one of the overcurrent condition or an under voltage condition.

8. The power supply of claim 3, wherein the controller enables the driver circuit for a predefined time period in response to a detection that the voltage across the input power source is below a predefined threshold and wherein the driver circuit ensures that the at least one FET is switched on during the predefined time period.

9. The power supply of claim 3, wherein the at least one FET includes a plurality of metal-oxide-semiconductor field-effect transistors (MOSFETs) coupled in a parallel configuration to each other and wherein the driver circuit ensures that an alternating current (AC) component of the load current is shared equally among the plurality of MOSFETs.

10. The power supply of claim 8, wherein the controller disables the driver circuit on expiration of the predefined time period and wherein the driver circuit can switch off the at least one FET subsequent to being disabled.

11. A system, comprising:
    a capacitor coupled with a set of paralleled field effect transistors (FETs) in a series configuration, wherein the combination of the capacitor and the set of paralleled FETs are coupled in parallel with a load and a power source; and
    a control circuit coupled to the set of paralleled FETs; wherein the control circuit delays turning off of the set of paralleled FETs for a predefined time period in response to a detection that a voltage level across the power source is less than a predetermined threshold level; and
    the paralleled FETs provide a load current path for an alternating current (AC) component of a load current.

12. The system of claim 11, wherein the control circuit is configured to turn off the set of paralleled FETs in response to a detection of at least one of an overcurrent condition or an under voltage condition.

13. The system of claim 11, wherein the control circuit is configured to prevent the set of paralleled FETs from operating in a linear region.

14. The system of claim 11, wherein the control circuit is configured to enable the load upon the turning on of the set of paralleled FETs.

15. A system, comprising:
    a set of paralleled field effect transistors (FETs) coupled in series with an output capacitor and coupled in parallel with a load that is coupled in parallel to an input power source; and
    a controller configured to operatively control the set of FETs based on a voltage across the input power source, wherein
    the set of FETs are switched on by the controller for a predefined time period, to provide a current path for a load current from the load to the input power source, if the voltage across the input power source falls below a predetermined threshold.

16. The system of claim 15, further comprising: an inrush current limiting resistor configured to provide a charging current to a capacitor coupled across the load.

17. The system of claim 15, wherein the controller prevents a linear mode operation of the set of FETs.

18. The system of claim 15, wherein the controller introduces a turn-off delay prior to switching off the set of paralleled FETs based on the predefined time period, if the input power source is at least one of switched off or disconnected.

19. The system of claim 15, wherein the output capacitor passes an alternate current (AC) component of a load current to the set of paralleled FETs.

20. The system of claim 15, wherein the output capacitor blocks a direct current (DC) component of a load current from passing to the set of FETs.

21. A method, comprising:
    detecting that a voltage across a power supply coupled in parallel with a load is below a predefined threshold;
    in response to the detecting, delaying switching of a set of field effect transistors (FETs) in a hot swap controller that are coupled in series with an output capacitor and in parallel with the load, for a predefined time period;
    during the time period, receiving an input current, comprising an alternate current (AC) component and a direct current (DC) component, from the load;
    passing the AC component through the set of FETs; and
    delivering the DC component to the power source.

22. The method of claim 21, wherein the detecting includes detecting at least one of the power source is switched off or the power source is disconnected.

23. The method of claim 22, wherein the passing includes passing equal portions of the AC component through the respective FETs in the set of FETs.

24. The method of claim 21, wherein the delaying includes supplying a high gate voltage to the set of FETs during the predefined time period after the detecting.

25. The method of claim 24, wherein the delaying includes switching off the set of FETs upon expiration of the predefined time period.

* * * * *